United States Patent
Gobbi

[11] Patent Number: 5,535,970
[45] Date of Patent: Jul. 16, 1996

[54] UNIVERSAL CLAMP FOR SUPPORTING THE WALL MOUNTED PIPING OF EXTERNAL ELECTRICAL, TELEPHONE OR PLUMBING SYSTEMS

[76] Inventor: Gianfranco Gobbi, Via Quercettino 12, Agugliano (Ancona), Italy

[21] Appl. No.: 319,422

[22] Filed: Oct. 6, 1994

[30] Foreign Application Priority Data

Oct. 20, 1993 [IT] Italy ................. MC93A0086

[51] Int. Cl.$^6$ ........................................ F16L 3/08
[52] U.S. Cl. ................ 248/74.2; 24/557; 248/74.1
[58] Field of Search .................. 248/51, 52, 65, 248/67.7, 68.1, 70, 73, 74.2, 316.9, 231.9; 24/487, 545, 553, 557

[56] References Cited

U.S. PATENT DOCUMENTS

| | | | |
|---|---|---|---|
| 2,127,257 | 8/1938 | Hornberger | 24/553 X |
| 2,166,916 | 7/1939 | Lombard | 248/74.2 X |
| 2,948,940 | 8/1960 | Degener | 248/74.2 X |
| 3,081,574 | 3/1963 | Wise | 24/545 X |
| 3,444,596 | 5/1969 | Soltysik | 248/73 |
| 4,116,332 | 9/1978 | Hartley | 206/209 |
| 4,195,807 | 4/1980 | Llaugé | 248/74.2 |
| 4,295,618 | 10/1981 | Morota et al. | 248/73 |
| 4,762,296 | 8/1988 | Kraus et al. | 248/487 X |
| 5,251,857 | 10/1993 | Grice et al. | 248/74.2 X |
| 5,361,463 | 11/1994 | Revis | 24/557 X |
| 5,402,558 | 4/1995 | Santapa | 24/557 |

FOREIGN PATENT DOCUMENTS

| | | | |
|---|---|---|---|
| 459941 | 9/1968 | Switzerland | 24/557 |
| 566419 | 9/1975 | Switzerland | 24/557 |

*Primary Examiner*—Alvin C. Chin-Shue
*Assistant Examiner*—Korie H. Chan
*Attorney, Agent, or Firm*—Leonard Bloom

[57] ABSTRACT

A universal clamp for supporting external wall mounted piping includes a single structural part having a flexible semicircular collar internally supporting a pair of opposing flexible curved and intersecting jaws. End elements of the jaws are positioned so that their respective concave sections face each other.

9 Claims, 1 Drawing Sheet

5,535,970

UNIVERSAL CLAMP FOR SUPPORTING THE WALL MOUNTED PIPING OF EXTERNAL ELECTRICAL, TELEPHONE OR PLUMBING SYSTEMS

BACKGROUND OF THE INVENTION

This design patent application concerns a universal clamp for supporting the wall mounted piping commonly used for external electrical, telephone or plumbing systems.

When it is not possible to lay piping in ducts, the piping is generally fixed to the wall by means of special wall attachments.

Currently, the most commonly used attachment system consists of a metal or plastic hoop having a base that is screwed or nailed to the wall, with a strap fitting into a special clasp which permits the belt to slide only in the direction required to gradually fasten the pipe in the loop formed by said strap.

Consequently, once the strap has been fitted into its clasp it can no longer be removed.

Although this type of irreversible fastening method ensures that the strap will not loosen in time, it does however limit the versatility of the hoop in that the same may in fact only be used once.

In the case of maintenance operations requiring temporary removal of the piping, said hoops have to be removed and replaced with new hoops once the repair has been completed. Another disadvantage of these hoops is that a different hoop model is required for the different sized piping available on the market since the length of the strap must obviously be increased proportionally to the diameter of the pipe; nor is it possible to use hoops with standardized length in that these become awkward to handle in the case of piping having a small cross-section.

BRIEF SUMMARY OF THE INVENTION

In order to resolve both these disadvantages the applicant previously designed and patented a device that allows repeated and unlimited assembly and disassembly of the pipe without in any way damaging the fastening device itself.

This device consists of a pair of plastic scissor type clamps moulded in a single piece whose jaws are joined at a centre welding seam that acts as pivoting and connection pin for the same.

One of the two jaws is shaped so that it may be fixed against a wall by means of normal screws, while the other jaw is characterised by a shaped element designed to facilitate opening of the clamp by means of a pressure that overcomes the resistance produced by an opposing spring fitted between the ends of the jaw which automatically shut the mobile jaw against the fixed jaw mounted on the wall. By opening the two jaws sufficiently it is possible to fit pipes having different diameters between the same and to fasten the pipes with equal efficiency when the jaws close automatically.

The only disadvantage of said clamp is that the assembly of the spring that automatically shuts the jaws between the same makes it expensive to produce.

The purpose of this invention is to design a new universal clamp model for supporting wall mounted external piping, which shuts without the use of an external elastic mechanism and accessory.

The item according to the invention involves a monoblock clamp characterised by a flexible semi-circular collar supporting a pair of opposing and intersecting flexible curved jaws whose terminal grasping elements are turned so that their respective concave surfaces face and shut automatically against each other.

Said end grasping elements may be opened by overcoming the flexing resistance of their respective jaws, or by overcoming the flexing resistance of the supporting semi-collar of the jaws; in either case, said flexing resistance, on one hand opposes the opening of the clamp but on the other hand ensures the elastic return of the same to their closed position.

Even if in the preferred embodiment, the clamp according to the invention is moulded in a single piece of plastic, alternative embodiments are possible in suitably bent sheet plate or wire.

By suitably shaping the internal profile of the end grasping elements of the clamp according to the invention, the same may be used for different purposes with respect to that for which the clamp is specifically designed, such as a tool for the home etc.

The clamp according to the invention could consequently be used as clothes pegs or as wall mounted clamp to hold brooms or similar items, or even as a desk paper holder.

BRIEF DESCRIPTION OF THE DRAWINGS

For major clarity the description continues with reference to the drawings which are intended for purposes of illustration and not in a limiting sense, where.

DESCRIPTION

Figure 1:
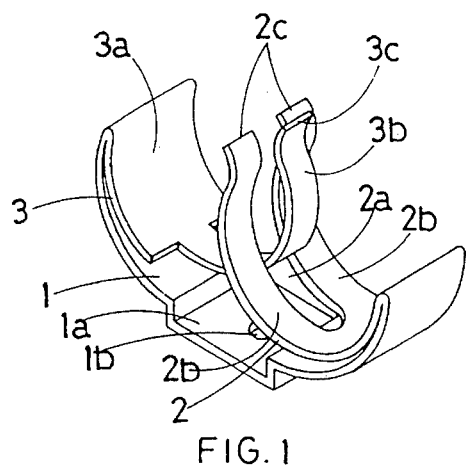
FIG. 1 is an axonometric view of the preferred embodiment of the clamp according to the invention.
Figure 2:
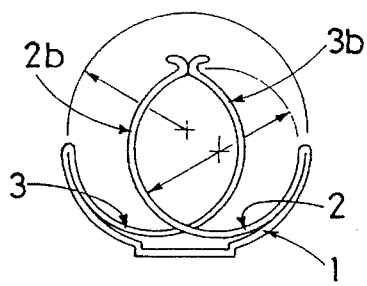
FIG. 2 is a side view of the clamp shown in FIG. 1.
Figure 3:
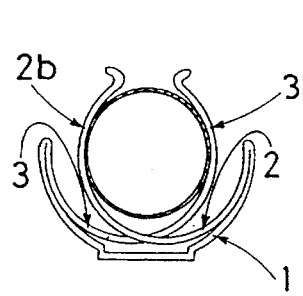
FIGS. 3 and 4 are side views of the clamp shown in FIG. 1, holding pipes of different diameters.
Figure 4:
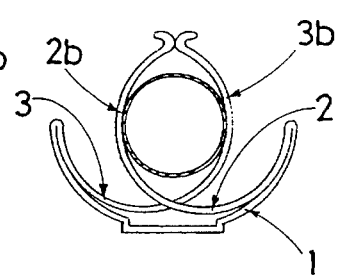

With reference to FIG. 1, the clamp according to the invention consists of a monoblock having a semi-circular external collar (1) supporting a pair of internal opposing jaws (2 and 3) characterised by curved and intersecting profiles.

As shown in the figure, the ends of the semi-circular collar (1) curl inwards and are characterised by a very small radius of curvature; said ends connecting respectively to the two jaws (2 and 3), both having the same curved profile with diameter (d) greater than the radius of curvature (R) of the semi-circular collar (1).

In the version shown in FIG. 1, the width of jaw (2) is equal to that of the semi-circular collar (1) and is characterised by a centre slot (2a) that cuts most of its length as from its end section, so that said jaw (2) consists of a pair of curved claws (2b) separated by the slot (2a).

Jaw (3) is characterised by an initial short section (3a) whose width is equal to that of the semi-circular collar (1), terminating with a curved centre claw (3b) having a smaller width, which intersects the slot (2a) thereby opposing and grasping the pair of claws (2b).

The grasping claws (2b and 3b) terminate with a very short section curving outwards (2c and 3c) thereby making it possible to fit any wedge-shaped object between the same, with consequent gradual opening of the claws.

The grasping claws (2b and 3b) may also be opened by tightening the semi-circular collar (1) sufficiently to elastically bend the same.

The centre of the semi-circular collar (1) being characterised by a deck (1a) fixed against the wall along which the external piping is mounted.

Said section (1a) having a centre screw hole (1b) for fixing the same to the wall.

Figure 5:
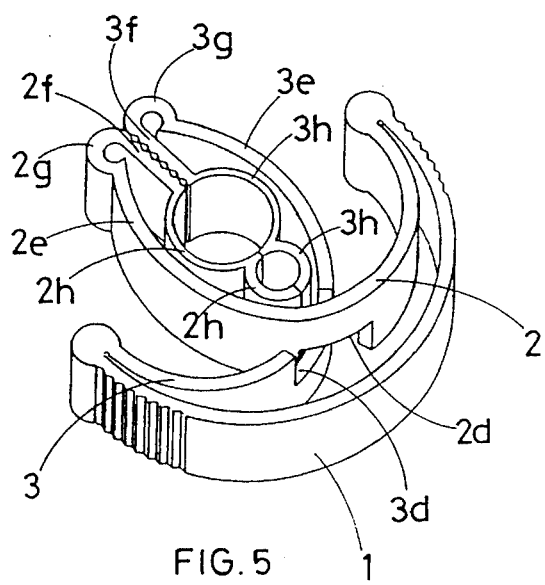
FIG. 5 is an axonometric view of an alternative embodiment of the clamp according to the invention.

FIG. 5 shows a version of the clamp in question realised in a single piece having a semi-circular collar (1) supporting a pair of opposing jaws (2 and 3) characterised by curved and intersecting profiles.

In this version, intersection of the jaws (2 and 3) is achieved by means of two grooves (2d and 3d) at which the width of the jaws (2 and 3) is halved thereby allowing the grooved jaw sections to fit together when they intersect.

In the version shown in FIG. 5, the internal profile of the end sections of the jaws (2 and 3) is shaped to allow the clamp to grasp thin items such as sheets of paper or fabric.

In particular, the curved opposing sections (2e and 3e) of jaws (2 and 3) being characterised by two abutting plates (2f and 3f) connected by means of a curl (2g and 3g) to the above curved opposing sections (2e and 3e) of jaws (2 and 3).

Said plates (2f and 3f) being fitted with an opposing pair of semi-circular loops (2h and 3h) whose utility can be appreciated when the clamp according to the invention is used as clothes pegs; in this case, it is the clothes line that is housed in the pair of loops (2h and 3h).

Figure 6:
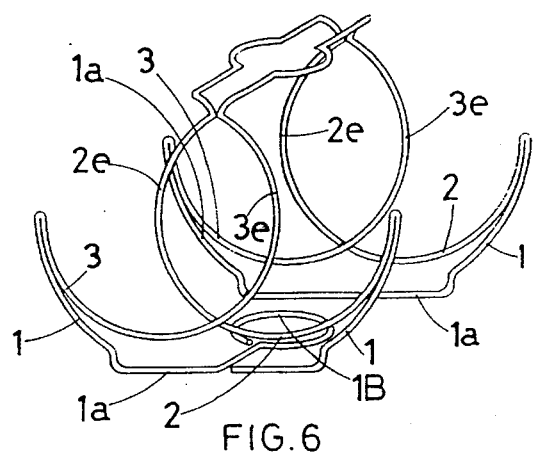
FIG. 6 is an axonometric view of an alternative embodiment of the clamp according to the invention produced with a piece of folded metal wire.

The version of the clamp according to the invention shown in FIG. 6 differentiates from the previous version only in that it is made with a single folded wire.

This version is again characterised by the semi-circular collar (1), the intersecting curved jaws (2 and 3), the opposing grasping elements (2e and 3e) and the deck (1a), consisting of pairs of parallel filiform arcs.

The hole (1b) characterising the version shown in FIG. 1, is realised in the version shown in FIG. 6 by a grommet (1B) formed by the wire.

We claim:

1. An integral clamping unit for supporting an elongated object, comprising:

first and second resilient C-shaped jaws, each having first and second ends, and each of said first and second jaws include a grasping claw between the respective first and second ends thereof; and a semi-circular resilient collar having first and second uppermost ends;

each of the first ends of said first and second jaws, respectively, being integrally connected to a respective one of said first and second uppermost ends of the collar;

wherein said first and second jaws opposingly extend and intersect each other inside and substantially below the uppermost first and second ends of said collar to define an intersection;

wherein each of said grasping claws extends from the intersection of said first and second jaws to said second ends of each of said first and second jaws, the grasping claws each having a concave section, wherein the grasping claws of said first and second jaws face each other with their concave sections;

wherein the elongated object to be supported is received between said first and second jaws, and is resiliently engaged by the grasping claws of each of said first and second jaws.

2. The integral clamping unit of claim 1, wherein the grasping claw of said first jaw includes a pair of spaced-apart grasping claw portions separated by a central slot;

wherein the grasping claw of said second jaw includes a center claw; and wherein said center claw of the second jaw is intersected with said central slot at the first jaw.

3. The integral clamping unit of clamp 1, wherein each of said first and second jaws is provided with a respective groove at their intersection, said groove reducing a width of each of said first and second jaws thereby facilitating their intersecting.

4. The integral clamping unit of claim 1, wherein the elongated object is a surface mounted elongated object, wherein a deck is centrally positioned at the semi-circular collar for being attached to a surface, and wherein said deck has a central screw hole for fixing the deck to the surface.

5. The integral clamping unit of claim 1, further including a pair of abutting plates, each secured to and integrally connected at said second end of a respective one of said first and second jaws, wherein each of said abutting plates includes at least one semi-circular loop, and wherein when the abutting plates engage each other, said semi-circular loops being attached to each other form a single circular loop for supporting the elongated object.

6. The integral clamping unit of claim 5, wherein each of said abutting plates is connected to the respective one of said first and second jaws by a curl, and wherein each of said abutting plates has a plurality of serrations frictionally securing a substantially flat object between said abutting plates.

7. The integral clamping unit of claim 1, made of plastic.

8. The integral clamping unit of claim 1, made of a single metal strip.

9. The integral clamping unit of claim 1, comprising a pair of substantially identical said integral clamping units, both said identical integral clamping units being made of a single piece of wire, wherein said first jaws of said identical integral clamping units are integrally connected at their second ends, wherein said second jaws of said identical integral clamping units are integrally connected at their second ends, wherein one of ends of said single piece of wire is curved to form a closed loop between said semi-circular collars of said identical integral clamping units for fixing said integral clamping unit to a surface whereon the elongated object is to be mounted.

* * * * *